(12) United States Patent
Bouazizi et al.

(10) Patent No.: US 8,495,228 B2
(45) Date of Patent: Jul. 23, 2013

(54) SYSTEM AND METHOD FOR OPTIMIZING DOWNLOAD USER SERVICE DELIVERY TO ROAMING CLIENTS

(75) Inventors: Imed Bouazizi, Tampere (FI); Ramakrishna Vedantham, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 12/104,304

(22) Filed: Apr. 16, 2008

(65) Prior Publication Data
US 2009/0077247 A1  Mar. 19, 2009

Related U.S. Application Data

(60) Provisional application No. 60/913,512, filed on Apr. 23, 2007.

(51) Int. Cl.
*G06F 15/16* (2006.01)
(52) U.S. Cl.
USPC .......................................... 709/229; 709/200
(58) Field of Classification Search
USPC .......................................... 709/229, 203, 200
See application file for complete search history.

(56) References Cited

U.S. PATENT DOCUMENTS

| | | | |
|---|---|---|---|
| 7,162,691 B1 * | 1/2007 | Chatterjee et al. | 715/205 |
| 2005/0076369 A1 * | 4/2005 | Cai et al. | 725/62 |
| 2005/0083929 A1 * | 4/2005 | Salo et al. | 370/389 |
| 2006/0034202 A1 * | 2/2006 | Kuure et al. | 370/312 |
| 2006/0193337 A1 * | 8/2006 | Paila et al. | 370/432 |
| 2008/0181158 A1 * | 7/2008 | Bouazizi et al. | 370/312 |

OTHER PUBLICATIONS

"Universal Mobile Telecommunications System (UMTS); Multimedia Broadcast/Multicast Service (MBMS); Protocols and codecs (Release 7)". 3GPP TS 26.346 V7.3.0, Mar. 2007.
Ericcson, "Correction to the OMA Push based MBMS download method". 3GPP TSG-SA WG4 Meeting #43, Apr. 13, 2007.

(Continued)

*Primary Examiner* — El Hadji Sall
(74) *Attorney, Agent, or Firm* — Banner & Witcoff, Ltd.

(57) ABSTRACT

A system and method for providing MBMS content distribution using unicast bearers. According to various embodiments, MBMS download user services are delivered to pieces of user equipment by delivering a FLUTE file delivery table via an OMA Push message. One of a number of different additional actions may be used in the delivery of the MBMS download user services. These actions include (1) making a single HTTP GET request using simple URL-encoding format to retrieve all files of the FDT; (2) making a single HTTP GET request using "group" field of FDT in URL-encoding to retrieve a logical group of files of the FDT; (3) making pipelined HTTP GET requests where each HTTP GET request retrieves at least one file of the FDT; (4) making serialized HTTP GET requests where each HTTP GET request retrieves at least one file of the FDT; (5) making pipelined HTTP GET requests where each HTTP GET request retrieves at least one logical group of files of the FDT; (6) making serialized HTTP GET requests where each HTTP GET request retrieves at least one logical group of files of the FDT; (7) delivering the serviceID of the MBMS user service in the above mentioned OMA PUSH message but not including the serviceID in the FLUTE FDT; (8) an HTTP request to de-register the MBMS UE from the BM-SC for stopping the unicast delivery of the MBMS download user service; and (9) delivering the FDT Instance ID of the FDT Instance in an OMA Push message.

52 Claims, 5 Drawing Sheets

OTHER PUBLICATIONS

"Universal Mobile Telecommunications System (UMTS); Multimedia Broadcast/Multicast Service (MBMS); Protocols and codecs (Release 7)". 3GPP TS 26.346 V7.7.0, Mar. 2008.

Paila et al. "Flute-File Deliveryy over unidirectional Transport". Internet Engineering Task Force, Oct. 1, 2004.

Wireless Application Protocol Forum: "Push OTA Protocol, Wireless Application Protocol." WAP-235-PUSHOTA-20010425-A, Apr. 25, 2001.

International Search Report for PCT Application No. PCT/IB2008/051466.

* cited by examiner

SYSTEM AND METHOD FOR OPTIMIZING DOWNLOAD USER SERVICE DELIVERY TO ROAMING CLIENTS

FIELD OF THE INVENTION

The present invention relates generally to multimedia broadcast multicast services (MBMS). More particularly, the present invention relates to MBMS content distribution using unicast bearers.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, mobile broadcast solutions have been standardized by different organizations, such as the 3rd Generation Partnership Project (3GPP) MBMS. 3GPP MBMS enables the resource-efficient delivery of popular multimedia content to the mobile users. A MBMS client can receive content via download delivery, streaming delivery and a combination of streaming delivery and download delivery.

MBMS is a feature described in 3GPP Release 6. However, MBMS may be deployed by operators in only a few areas where it is cost efficient to have broadcast/multicast distribution of popular content. When MBMS subscribers move to areas where there is no MBMS coverage, the operator may distribute the MBMS content in unicast mode. In such a use case, application/transport layer signaling is required in order to ensure the seamless handover between broadcast/multicast mode reception and unicast mode reception of MBMS content.

One of the objectives of a 3GPP SA4 Release 7 work item on MBMS user service extensions is to specify the application/transport layer signaling needed for MBMS content distribution in unicast mode (over streaming and interactive bearers). Another objective is to specify optimization techniques for MBMS content delivery.

Table 1 below shows the current working assumptions in 3GPP SA4 for the mapping between protocols to be used in broadcast/multicast and unicast modes.

TABLE 1

|  | Download only Delivery Method | Streaming only Delivery Method | Streaming + Download Delivery Methods |
| --- | --- | --- | --- |
| MBMS Content Distribution using Broadcast/Multicast Bearers | FLUTE/UDP | MBMS Streaming Framework RTP/UDP for media transport RTP/UDP for FEC transport | MBMS Streaming Framework RTP/UDP for media transport RTP/UDP for FEC transport + FLUTE/UDP for file download |
| MBMS Content Distribution using Unicast Bearers (For roaming MBMS clients) | OMA-PUSH for FDT transfer HTTP GET requests for individual files | PSSe RTSP for session control RTP/UDP for media transport | PSSe RTSP for session control RTP for media transport FLUTE/UDP for file download in the same RTSP session |

The File Delivery over Unidirectional Transport (FLUTE) protocol is discussed in the Internet Engineering Task Force (IETF) Request for Comments (RFC) 3926, available at www.ietf.org/rfc/rfc3926.txt. The User Datagram Protocol (UDP) is discussed in IETF RFC 768, available at www.ietf.org/rfc/rfc0768.txt. The Real-time Transport Protocol (RTP), a transport protocol for real-time applications, is discussed in IETF RFC 3550, available at www.ietf.org/rfc/rfc3550.txt. The Real Time Streaming Protocol (RTSP) is discussed in IETF RFC 2326, available at www.ietf.org/rfc/rfc2326.txt.

The 3GPP Packet-switched Streaming Service (PSS) is the 3GPP's solution for enabling packet-switched streaming in mobile devices. PSS defines protocols and media codecs for enabling the streaming service for mobile devices. PSS is based on RTSP for session setup and control. 3GPP Packet-switched Streaming Service enhancements (PSSe) are currently being defined in 3GPP. The goal of these enhancements is to define extensions to 3GPP PSS Release No. 6 to optimize the streaming service. A general description of PSS can be found in 3GPP TS 26.233 V6.0.0 (2004-09): Transparent end-to-end packet switched streaming service (PSS); General description (Release 6), available at www.3gpp.org/ftp/Specs/archive/26_series/26.233/. The PSS transport protocols and codecs are specified in 3GPP TS 26.234 V7.2.0 (2007-03) and are available at www.3gpp.org/ftp/Specs/archive/26_series/26.234/.

Section 7.4 of 3GPP TS 26.346-730 describes the usage of the Open Mobile Alliance (OMA) Push mechanism for MBMS download, when MBMS bearers are not available, in two steps. With this mechanism, the MBMS user equipment (UE) first registers its Mobile Station Integrated Services Digital Network (MSISDN) with the Broadcast Multicast Switching Center (BM-SC) to receive the download sessions using OMA Push. The BM-SC then distributes a FLUTE file delivery table (FDT) instance, which allows the MBMS UE to fetch files of interest.

SUMMARY OF THE INVENTION

Various embodiments provide a mechanism for delivering MBMS download user services to MBMS UEs that require unicast delivery, e.g., when roaming or in a handover outside of a MBMS coverage area. In these embodiments, the mechanism involves delivering the FLUTE FDT via an OMA Push message. Additionally, one of a number of different additional actions may be used in the delivery of the MBMS download user services. These actions include (1) making a single HTTP GET request using simple URL-encoding format to retrieve all files of the FDT Instance, which may be identified, for example, by its FDT Instance ID; (2) making a single HTTP GET request using "group" field of FDT in URL-encoding to retrieve a logical group of files of the FDT or the FDT Instance, which be identified, for example, by its FDT Instance ID; (3) making pipelined HTTP GET requests where each HTTP GET request retrieves at least one file of the FDT Instance, which may be identified, for example, by its FDT Instance ID; (4) making serialized HTTP GET requests where each HTTP GET request retrieves at least one file of the FDT Instance, which may be identified, for example, by its FDT Instance ID; (5) making pipelined HTTP GET requests where each HTTP GET request retrieves at least one logical group of files of the FDT Instance, which may be identified, for example, by its FDT Instance ID; (6) making serialized HTTP GET requests where each HTTP GET request retrieves at least one logical group of files of the FDT; (7) delivering the serviceID of the MBMS user service in the above mentioned OMA PUSH message but not including the serviceID in the FLUTE FDT; (8) an HTTP request to de-register the MBMS UE from the BM-SC for stopping the unicast delivery of the MBMS download user service; and (9) delivering the FDT Instance ID of the FDT Instance in an OMA Push message, so that the MBMS UE can refer to a specific FDT instance in its requests for unicast file delivery according to embodiments (1)-(7) described above.

An advantage of the embodiment where the serviceID of the MBMS user service is delivered in an OMA PUSH message, but not including the serviceID in the FLUTE FDT, is that it enables the OMA Push client to direct the FDT to the relevant client application without parsing the FDT.

An advantage of the embodiment where an HTTP request is used to deregister the MBMS UE from the BM-SC for stopping the unicast delivery of the MBMS download user service is that it reduces the wastage of network resources otherwise spent for sending unwanted OMA Push messages to the MBMS UE.

An advantage of the other embodiments discussed above is that they specify various alternative efficient formats for HTTP requests to retrieve the files of interest using unicast bearers from the BM-SC to the MBMS UE. These embodiments provide both flexibility and efficiency for the MBMS UE to request individual files, logical groups of files and all of the files in the MBMS download session. These embodiments also reduce the delay in acquiring the MBMS download user service in unicast mode by the use of HTTP pipelining and the use of semantics to request groups of files in one HTTP request. These embodiments still further provide a possibility for the BM-SC to package the files as requested by the MBMS UE.

These and other advantages and features of the various embodiments described herein, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
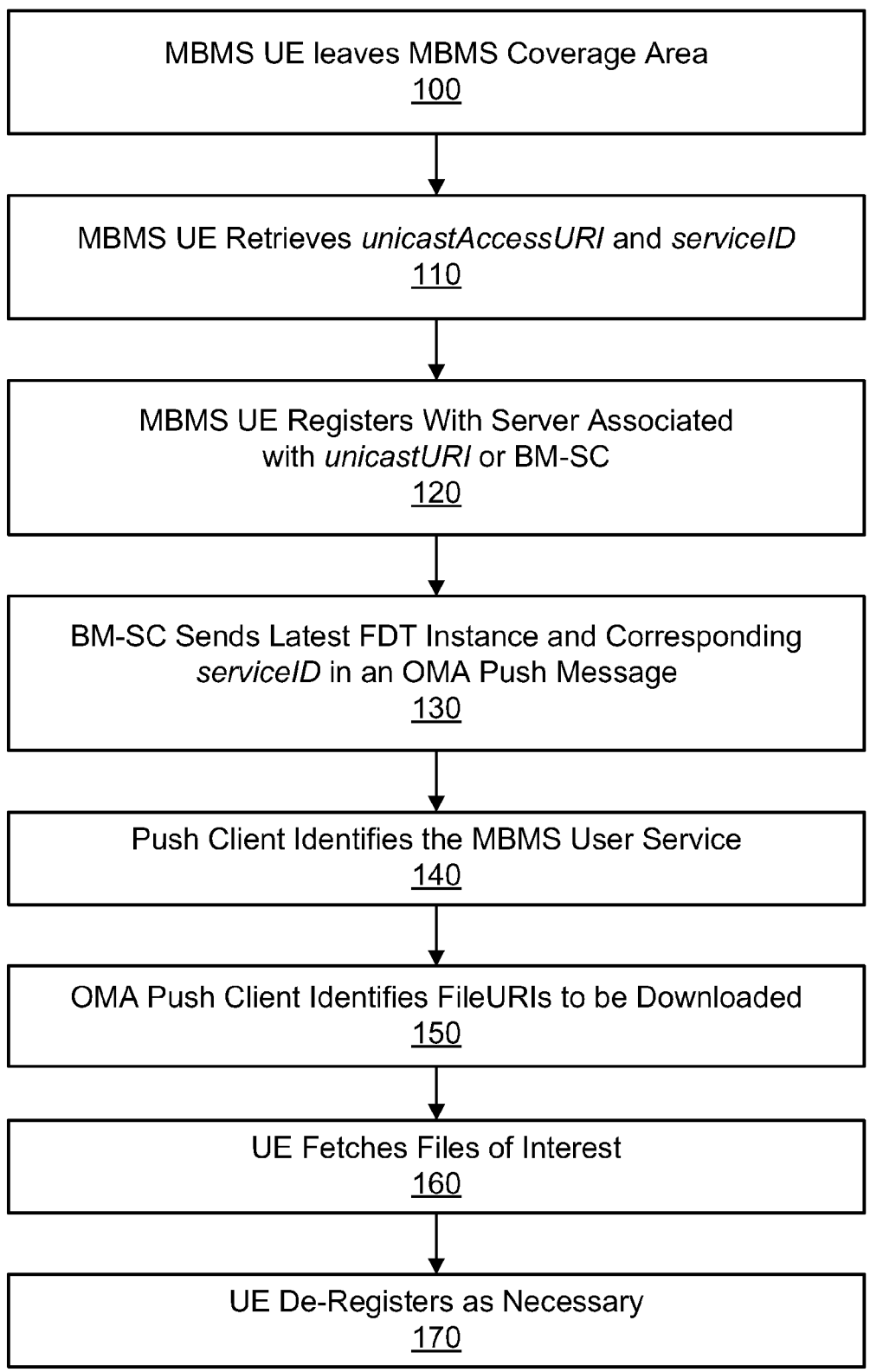
FIG. 1 is a flow chart depicting a process by which various embodiments may be implemented.

If a MBMS UE is outside of its home network where the MBMS download content of interest is not available over MBMS bears, or the MBMS UE is involved in a handover out of a MBMS coverage area, the MBMS UE may register for unicast service delivery, if the MBMS User Service Description for this service includes a unicastAccessURI attribute in the deliveryMethod element. The Hypertext Transfer Protocol (HTTP) GET method may be used for registration, and the serviceId and the MSISDN of the MBMS UE are encoded into the Uniform Resource Identifier (URI) query part as defined below and included in the HTTP GET request. GET/ unicastReg?serviceId=urn:3gpp: 0010120123hotdog&MSISDN=436642012345 HTTP/1.1 Host: bmsc.example.com HTTP is discussed in IETF RFC 2616 and is available at www.ietf.org/rfc/rfc2616.txt. URI is discussed in IETF RFC 3986 and is available at www.ietf.org/rfc/rfc3986.txt.

Currently, the signaling that is required for the BM-SC to distribute the FLUTE FDT instance is not defined. This signaling can be divided into two separate subprocesses. The first subprocess involves the message format from the BM-SC to the MBMS UE. The general usage of OMA Push for this purpose is specified in Section 7.4.3 of 3GPP TS 26.346-730. The FLUTE FDT of MBMS Download services may be put into an OMA Push session. The OMA Push client uses the Application ID to forward the OMA Push message to the Unicast MBMS file download client. The unicast MBMS file download dlient may then forward the received FDT Instance to the correct MBMS file download service, which is identified by the service ID.

However, the MBMS UE may have registered for multiple unicast MBMS services. Currently, the service ID is not available from the OMA Push message. Therefore, the MBMS UE cannot associate an incoming OMA Push message containing a FDT instance to the correct MBMS file download service. To address this issue, 3GPP Tdoc S4-070296 proposes to extend the FLUTE FDT with the ServiceID attribute of the User Service Description schema in the case of an OMA Push transmission. However, this approach suffers from a disadvantage in that the OMA Push client on the receiver has to first parse the FDT to extract the ServiceID before it can dispatch the FDT Instance to the relevant MBMS download service. With this approach, the FDT instance also needs to be modified by the push proxy gateway (PPG) (or some other instance in the network) to include the service ID.

The second subprocess involves the message format from the MBMS UE to the BM-SC to fetch the files of interest. After parsing the FDT instance received via the OMA Push mechanism, the receiver is able to identify which files of the session are of interest and can perform an HTTP GET request to retrieve (1) a specific file; (2) one or more specific FLUTE packets which are identified by (source block number (SBN), encoding symbol ID (ESI)); (3) all files in the FDT; or (4) a logical group of files in the FDT. The format of an HTTP GET request to retrieve these objects is not standarized in 3GPP. One option for addressing this issue involves extending the Point-to-Point (PtP)repair request/response mechanism defined in 3GPP TS 26.346. This solution defines a format of an HTTP GET request to retrieve one or more FLUTE packets or a single file from the PtP repair server. However, this solution does not define a format for requesting all files in the FDT and a logical group of files in the FDT is not defined. Section 7.2.6 of 3GPP TS 26.346-730 defines a semantic element "group" in the FDT for logical grouping of files in the session. However, the usage of this field for unicast download delivery is not specified.

Files downloaded as part of a multiple-file delivery are generally related to one another. Examples include web pages, software packages, and the referencing metadata envelopes and their metadata fragments. FLUTE clients analyze the XML-encoded FDT instances as they are received, identify each requested file, associate it with FLUTE packets using the Transport Object Identifier (TOI) and discover the relevant in-band download configuration parameters of each file. An additional "group" field in the FLUTE FDT instance and file elements enables logical grouping of related files. A FLUTE receiver should download all of the files belonging to all groups where one or more of the files of those groups have been requested. However, a UE may instruct its FLUTE receiver to ignore grouping to deal with special circumstances such as low storage availability. The group names are allocated by the FLUTE sender, and each specific group name groups the corresponding files together as one group, including files described in the same and other FDT Instances, for a session.

Group field usage in FDT instances is shown in the FDT XML schema (clause 7.2.10 of 3GPP TS 26.346-730). Each file element of an FDT Instance may be labeled with zero, one or more than one group name. Each FDT Instance element may be labeled with zero, one or more than one group names which are inherited by all of the files described in that FDT Instance.

Various embodiments provide a mechanism for delivering MBMS download user services to MBMS UEs that require unicast delivery, e.g., when roaming or in a handover out of a MBMS coverage area. In these embodiments, the mechanism involves delivering the FLUTE FDT via an OMA Push message. Additionally, one of a number of different additional actions may be used in the delivery of the MBMS download user services. These actions include (1) making a single HTTP GET request using simple URL-encoding format to retrieve all files of the FDT Instance, which may be identified, for example, by its FDT Instance ID; (2) making a single HTTP GET request using "group" field of FDT in URL-encoding to retrieve a logical group of files of the FDT or the FDT Instance, which be identified, for example, by its FDT Instance ID; (3) making pipelined HTTP GET requests where each HTTP GET request retrieves at least one file of the FDT Instance, which may be identified, for example, by its FDT Instance ID; (4) making serialized HTTP GET requests where each HTTP GET request retrieves at least one file of the FDT Instance, which may be identified, for example, by its FDT Instance ID; (5) making pipelined HTTP GET requests where each HTTP GET request retrieves at least one logical group of files of the FDT Instance, which may be identified, for example, by its FDT Instance ID; (6) making serialized HTTP GET requests where each HTTP GET request retrieves at least one logical group of files of the FDT; (7) delivering the serviceID of the MBMS user service in the above mentioned OMA PUSH message but not including the serviceID in the FLUTE FDT; (8) an HTTP request to de-register the MBMS UE from the BM-SC for stopping the unicast delivery of the MBMS download user service; and (9) delivering the FDT Instance ID of the FDT Instance in an OMA Push message, so that the MBMS UE can refer to a specific FDT instance in its requests for unicast file delivery according to embodiments (1)-(7) described above.

An advantage of the embodiment where the serviceID of the MBMS user service is delivered in an OMA PUSH message, but not including the serviceID in the FLUTE FDT, is that it enables the OMA Push client to direct the FDT to the relevant client application without parsing the FDT.

An advantage of the embodiment where an HTTP request is used to de-register the MBMS UE from the BM-SC for stopping the unicast delivery of the MBMS download user service is that it reduces the wastage of network resources otherwise spent for sending unwanted OMA Push messages to the MBMS UE.

An advantage of the other embodiments discussed above is that they specify various alternative efficient formats for HTTP requests to retrieve the files of interest using unicast bearers from the BM-SC to the MBMS UE. These embodiments provide both flexibility and efficiency for the MBMS UE to request individual files, logical groups of files and all of the files in the MBMS download session. These embodiments also reduce the delay in acquiring the MBMS download user service in unicast mode by the use of HTTP pipelining and then use of semantics to request groups of files in one HTTP request. These embodiments still further provide a possibility for the BM-SC to package the files as requested by the MBMS UE.

Various embodiments can be implemented through the performing of a number of processes which are depicted in FIG. 1. At 100 in FIG. 1, a MBMS UE leaves a MBMS coverage area. At 110, the MBMS UE retrieves the unicastAccessURI and the serviceID from the MBMS-user service description (USD). At 120, the MBMS UE registers its MSISDN and the serviceID with the server associated with the unicastAccessURI or the BM-SC. When the MBMS user service delivery starts, at 130 the BM-SC sends the latest FDT instance and the serviceID in an OMA Push message to the MBMS UE. In doing so, the BM-SC may use OTA-WSP or OTA-HTTP protocols. If OTA-HTTP is used, then the server may use a multi-part MIME structure to transmit the FDT instance, the corresponding FDT Instance ID, and the serviceID in separate parts. If OTA-WSP is used, the server uses the appropriate syntax to separately send the FDT instance, the corresponding FDT Instance ID, and the serviceID.

At 140 in FIG. 1, the OMA Push client in the MBMS UE identifies the MBMS user service from the serviceID. At 150, the OMA Push client then scans the FDT instance received in the same message to identify the fileURIs to be downloaded in that MBMS user service. At this point, the UE then possesses the necessary information about all of the files in the FLUTE session, including their file URIs, content encodings, content lengths, etc. The UE then fetches the files of interest from the BM-SC at 160 by initiating an HTTP GET request according to the following format:

```
unicast_access_request_http_URL = unicast_access_URI "?" query
unicast_access_URI = <unicastAccessURI from the User Service
Description; URI-reference is as defined in [IETF RFC 3986].>
```

If the UE is interested in obtaining all of the files from the FDT, it indicates this choice by using the following query in the HTTP GET request:

```
GET    /path/unicast_access?serviceID=abc&fdtInstanceID=
def&fileURI=*    HTTP/1.1
Host: bmsc.example.com
```

In the above case, the BM-SC may respond by sending all of the files from the FDT by using a multipart-MIME structure.

If the UE is interested in a logical group of files identified by their groupID in the FDT, it indicates this choice by using the following query in the HTTP GET request:

```
GET    /path/unicast_access?serviceID=abc&fdtInstanceID=
def&groupID=xyz    HTTP/1.1
Host: bmsc.example.com
```

In the above case, the BM-SC may respond by sending all of the files belonging to the logical groupID=xyz from the FDT instance with FDT Instance ID=def, by using a multipart-MIME structure.

If the UE is interested in a particular file, it indicates this choice by using the following query in the HTTP GET request:

```
GET    /path/unicast_access?serviceID=abcd&group_id=
www.example.com/news/latest.3gp&Content-MD5=
ODZiYTU1OTFkZGY2NWY5ODh==    HTTP/1.1
Host: bmsc.example.com
```

It should be noted that the content_md5, when included in the GET request, disambiguates between multiple versions of the same fileURI. MD5 is the "Message Digest algorithm 5", defined in RFC 1321 and available at www.ietf.org/rfc/rfc1321.txt. The content_md5 header field is defined in RFC 1864 and is available at www.ietf.org/rfc/rfc1864.txt.

With regard to the fetching of multiple unrelated files of FDT by using multiple pipelined or serialized HTTP GET requests, one solution is based upon the current specification and involves sending a series of HTTP GET requests for each file of interest. The client may pipeline the HTTP GET requests for the required files. The HTTP GET requests are formatted according to implementation for fetching a file of a FDT by using a single HTTP GET request.

HTTP pipelining is a technique in which multiple HTTP requests are written out to a single socket, without waiting for the corresponding responses. Pipelining is only supported in HTTP/1.1 The pipelining of requests results in a reduction in signaling delays, especially over high latency connections. Because it is usually possible to fit several HTTP requests in the same TCP packet, HTTP pipelining allows fewer TCP packets to be sent over the network, reducing the network load. Alternatively, a HTTP POST request which contains the file URIs and the corresponding contentMD5 of all files of interest in the message body can be sent. However, the use of the HTTP POST method is recommended only for idempotent services such as the modification of a database or the subscription to a service.

With regard to the fetching of multiple logical groups of files of FDT by using multiple pipelined or serialized HTTP GET requests, the approach is similar to the approach for fetching multiple unrelated files of FDT by using multiple pipelined or serialized HTTP GET requests. However, in this particular situation, the HTTP GET requests are formatted according to the implementation used for fetching a logical group of files in a single HTTP GET request.

With regard to the fetching of a combination of multiple unrelated files and multiple logical groups using multiple pipelined or serialized HTTP GET requests, the approach is similar to the approach for fetching multiple unrelated files of FDT by using multiple pipelined or serialized HTTP GET requests. However, in this particular situation, the HTTP GET requests are formatted according the implementations for either fetching a logical group of files in a single HTTP GET request or fetching a file of FDT by using a single HTTP GET request.

If the UE is interested in a set of unrelated files from the FDT, it indicates this choice by using the following query in the HTTP GET request:

```
GET   /path/unicast_access?serviceID=abc&fdtInstanceID=
def&fileURI=x1&contentMD5=y1&fileURI=x2&contentMD5=
y2&fileURI=x3&contentMD5=y3&fdtInstanceID=ghi&fileURI=
m1&contentMD5=n1& fileURI=m2&contentMD5=n2 HTTP/1.1
Host: bmsc.example.com
```

In the above example, the MBMS UE is requesting three files, x1, x2 and x3 from FDT Instance "def" and two files, m1 and m2, from FDT instance "ghi." The files' corresponding contentMD5s are y1, y2, y3, n1, n2, respectively. All of the files belong to the MBMS User service "abc." In this case, the BM-SC may respond by sending all of the files from the FDT by using a multipart-MIME structure.

If the UE is interested in more than one logical group of files in an FDT, it indicates this choice by using the following query in the HTTP GET request:

```
GET    /path/unicast_access?serviceID=abc&fdtInstanceID=
def&groupID=x1& groupID=x2&fdtInstanceID=ghi&groupID=x3.
HTTP/1.1
Host: bmsc.example.com
```

In the above example, the MBMS UE is requesting two logical groups, x1 and x2, from FDT Instance "def" and one logical group, x3, from FDT instance "ghi." All of the files belong to the MBMS User service "abc." In this case, the BM-SC may respond by sending all requested files from the FDT by using a multipart-MIME structure.

With regard to the fetching of a combination of one or more files and one or more logical groups of files in a single HTTP GET request, the implementation for this process is similar to the implementations for fetching multiple logical groups of files in a single HTTP GET request and fetching multiple, unrelated files in a single HTTP GET request.

An OMA PUSH message is used to deliver the FDT instance to the receiver. In order for the receiver to identify to which service (FLUTE session) the current FDT Instance relates, an indication of a unique identifier of the FLUTE session is needed. The Service ID is an example of such an identifier. This identifier needs to be sent along with the FDT Instance within each Push message. A Push message [i.e., a WAP-251-PushMessage] comprises a message header and a message body. The message header is similar to the HTTP message header and is given in textual representation with several header fields. The message body may contain any type of data that is identified by its content type. In various embodiments, two different methods can be used to signal the session identifier in the Push message. In the first method, the "X-Wap-Content-URI", as a header field of the message header, may be used for this purpose. This header field gives a URI of the current content. This URI can have the following form:

---

X-Wap-Content-URI="X-Wap-Content-URI:" namespace "?ServiceID=" ServiceID ["&SessionID=" SessionID]

--- namespace=URI is a registered namespace that can be of the form urn:3gpp:mbms:rel7:fdt-download, for example.

A second method of singalling the session identifier involves using the message body of the Push message. The message body is designed as a multipart mime message which contains 2 different parts. One part carries the FDT instance, and the other part carries the Service ID and/or the session ID and any other information. In the second method, an XML structure is used for the second part of the message.

If the MBMS UE does not need the unicast delivery of an MBMS user service (e.g., if the MBMS UE moves back to an MBMS coverage area or if it is not interested in the remaining content of the MBMS transmission session), then it can de-register itself from the BM-SC for the unicast delivery of the MBMS download service. De-registration is depicted at 170 in FIG. 1. If this de-registration does not occur, then the BM-SC continues sending the OMA Push messages (whenever there is a new FDT instance) to the MBMS UE, which is a waste of previous unicast delivery resources. Therefore, the HTTP GET message may be used in certain embodiments for de-registering the MBMS UE from the BM-SC in order to stop the unicast delivery of the MBMS download service identified by the serviceID.

---

GET /unicastDeReg?serviceId= urn:3gpp:0010120123hotdog&MSISDN=436642012345 HTTP/1.1
    Host: bmsc.example.com

---

Figure 2:
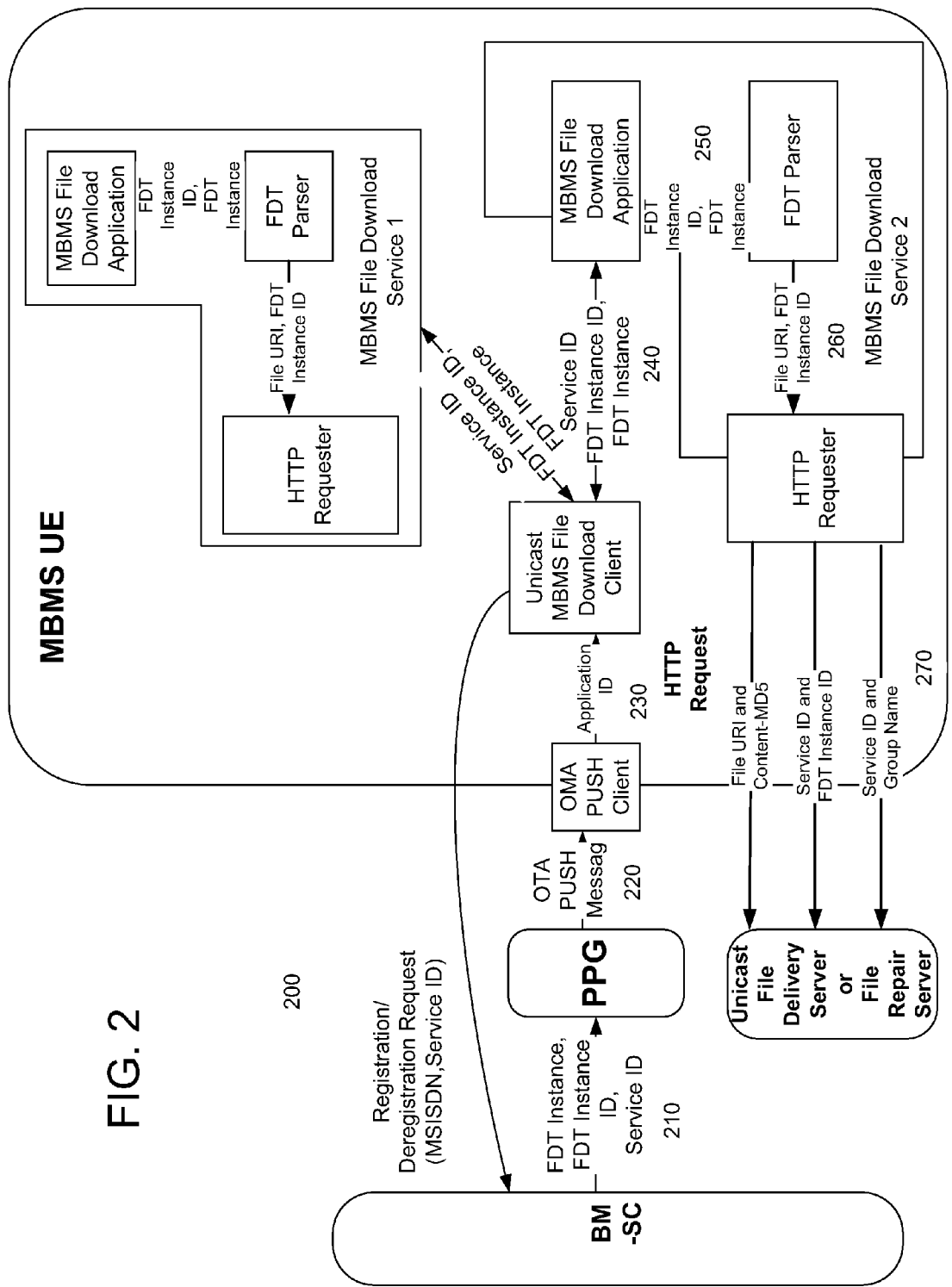
FIG. 2 is a graphical depiction of a system in which various embodiments of the present invention may be implemented

FIG. 2 is a graphical depiction showing the interaction between the MBMS UE, the BM-SC and other components according to various embodiments. At 200 in FIG. 2, a unicast MBMS file download client of the MBMS UE transmits a registration request to the BM-SC (de-registrations requests are also sent from the unicast MBMS file download client). At 210, the FDT instance, identified by the FDT instance ID, and the serviceID are sent to the PPG. At 220, the PPG sends an OTA Push message to the OMA Push client. At 230, the OMA Push client sends the application ID to the unicast MBMS file download client. At 240, the unicast MBMS file download client forwards the serviceID and the FDT instance, identified by the FDT instance ID, to the MBMS file download application of the appropriate MBMS file download service. at 250, the FDT instance, identified by the FDT instance ID, is sent to the FDT parser. The file URI and the FDT instance ID are then sent to an HTTP requester at 260, The HTTP requester then communicates with a unicast file delivery server or file repair server at 270.

Figure 3:
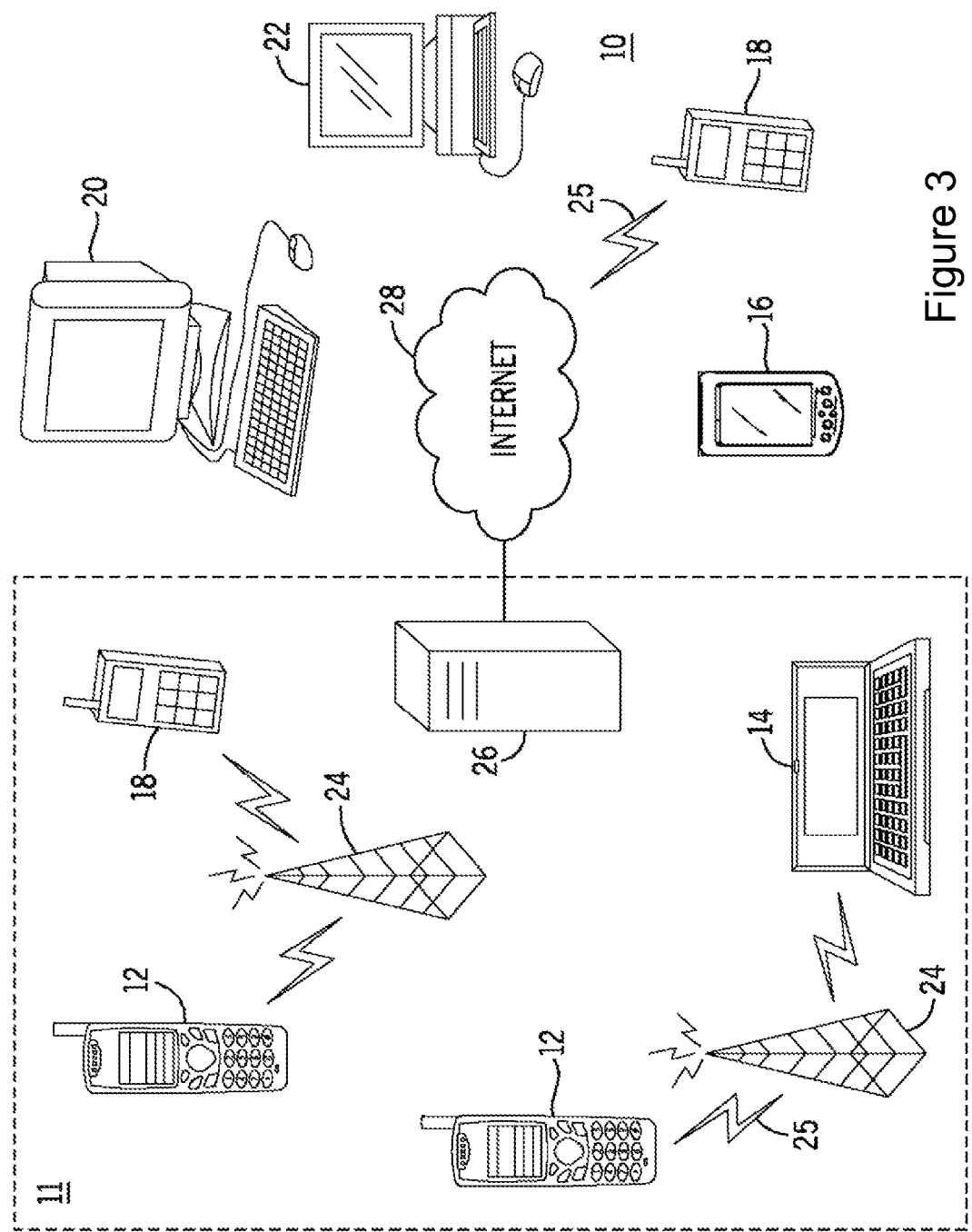
FIG. 3 is an overview diagram of a system within which various embodiments may be implemented.

FIG. 3 shows a system 10 in which various embodiments can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile electronic device 50 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments may communicate using various media including, but not limited to, radio, infrared, laser, cable connection, and the like.

Figure 4:
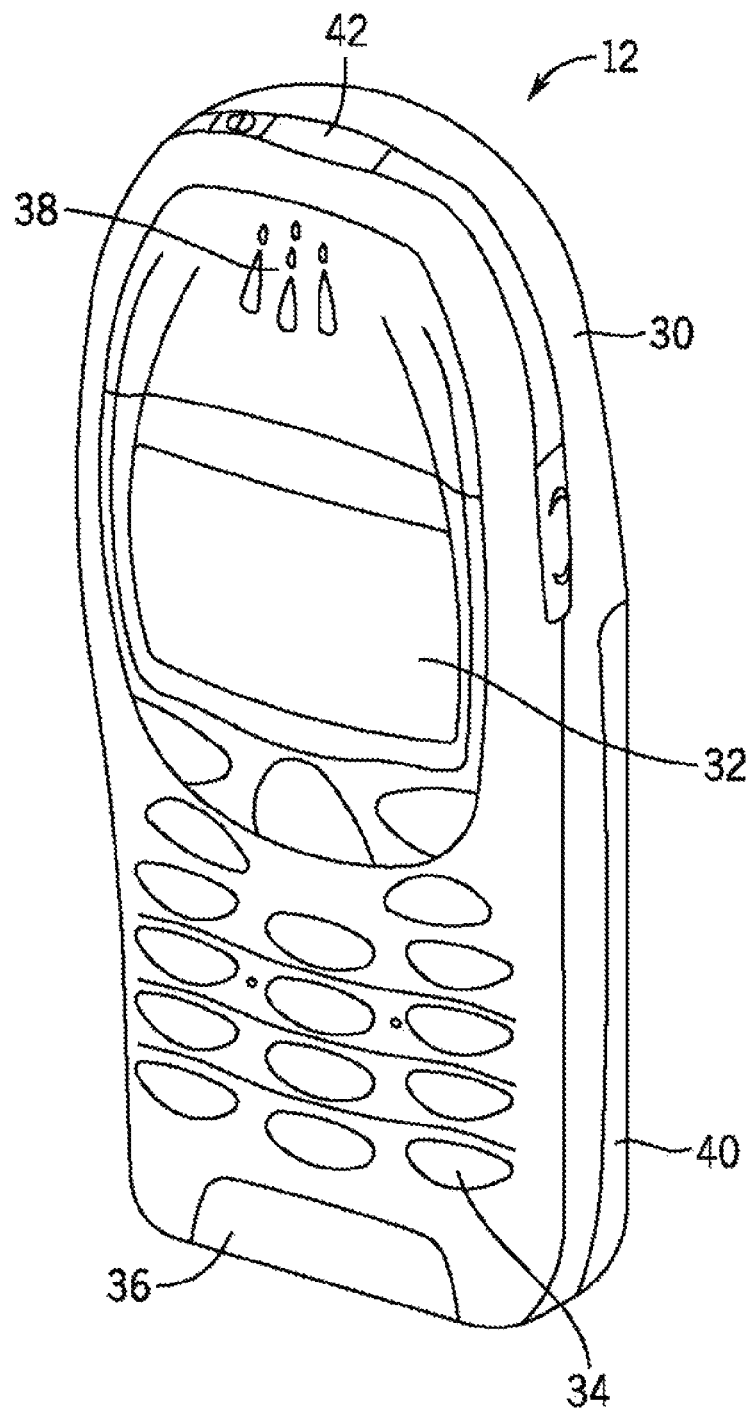
FIG. 4 is a perspective view of an electronic device that can be used in conjunction with the implementation of various embodiments.
Figure 5:
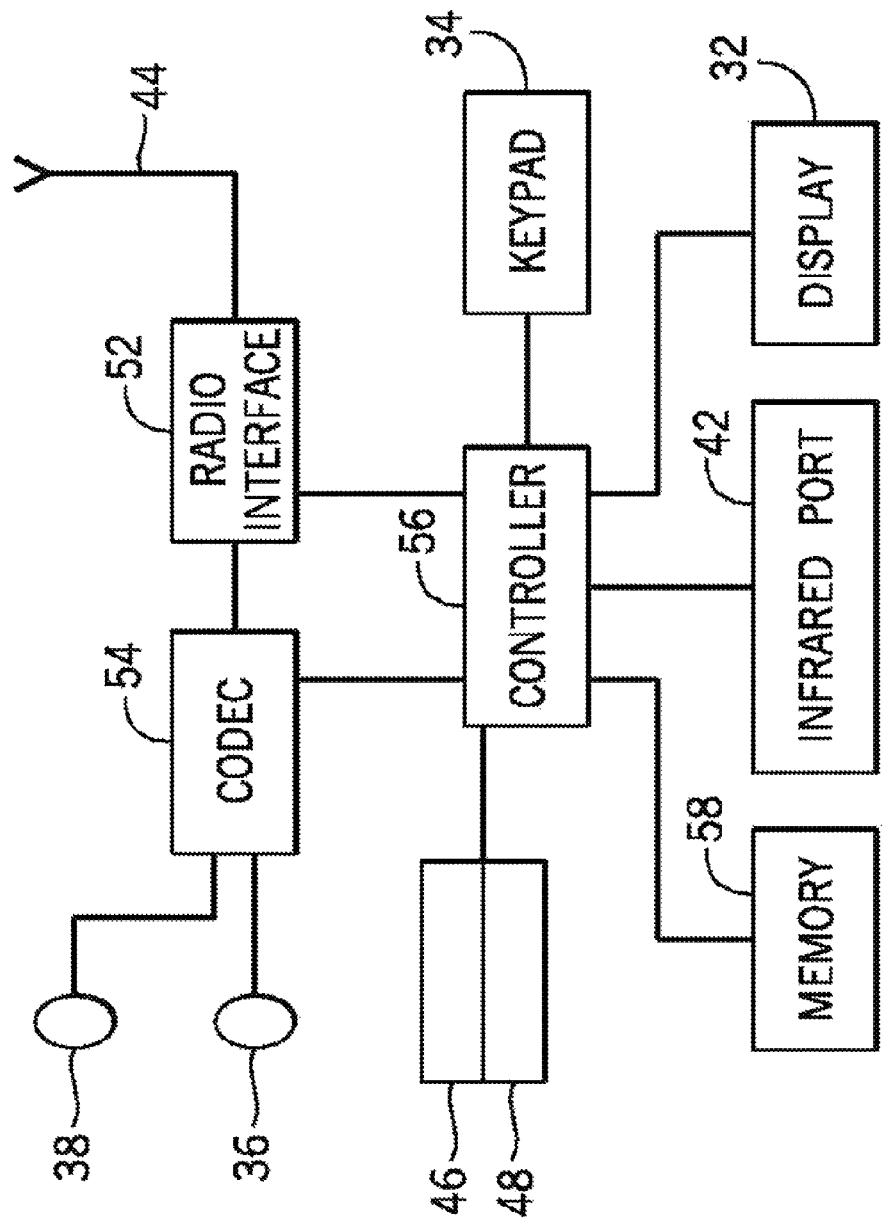
FIG. 5 is a schematic representation of the circuitry which may be included in the electronic device of FIG. 4.

FIGS. 4 and 5 show one representative electronic device 50 within which various embodiments may be implemented. It should be understood, however, that the various embodiments are not intended to be limited to one particular type of device.

The electronic device 50 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments have been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated.

What is claimed is:

1. A method, comprising:
   registering with one of a server and a broadcast multicast switching center;
   receiving a push message according to a push protocol, the push message comprising a file delivery table instance identifier and a service identifier of a multimedia broadcast multicast service protocol, the service identifier being separate data from a file delivery table instance identified by the file delivery table instance identifier;
   using the service identifier to identify a multimedia broadcast multicast service user service;
   identifying one or more files to be downloaded from the multimedia broadcast multicast service user service using a file delivery table instance; and
   fetching at least one of the one or more files using at least one HTTP GET request.

2. The method of claim 1, wherein the at least one of the one or more files comprises all files identified in the file delivery table instance, and wherein all of the files in the file delivery table instance are fetched using a single HTTP GET request.

3. The method of claim 1, wherein the at least one of the one or more files comprises a logical group of files, and wherein the logical group of files are fetched using a single HTTP GET request.

4. The method of claim 1, wherein the at least one of the one or more files comprises a single file, and wherein the single file is fetched using a single HTTP GET request.

5. The method of claim 1, wherein the at least one of the one or more files comprises multiple unrelated files, and wherein the multiple unrelated files are fetched using multiple HTTP GET requests.

6. The method of claim 1, wherein the at least one file of the one or more files comprises multiple logical groups of files and wherein the multiple logical groups of files are fetched using multiple HTTP GET requests.

7. The method of claim 1, wherein the at least one file comprises a combination of multiple unrelated files and multiple logical groups of files, and wherein the combination is fetched using multiple HTTP GET requests.

8. The method of claim 1, wherein the at least one of the one or more files comprises multiple unrelated files, and wherein the multiple unrelated files are fetched using a single HTTP GET request.

9. The method of claim 1, wherein the at least one of the one or more files comprises multiple logical groups of files, and wherein the multiple logical groups of files are fetched using a single HTTP GET request.

10. The method of claim 1, wherein the at least one of the one or more files comprises at least one unrelated file and at least one logical group of files, and wherein the at least one unrelated file and the at least one logical group of files are fetched using a single HTTP GET request.

11. The method of claim 1, further comprising transmitting an HTTP request to deregister from the broadcast multicast switching center.

12. A non-transitory memory including computer-executable instructions which, when executed by a processor, cause an apparatus to
   register with one of a server and a broadcast multicast switching center;
   receive a push message according to a push protocol, the push message comprising a file delivery table instance identifier and a service identifier of a multimedia broadcast multicast service protocol, the service identifier being separate data from a file delivery table instance identified by the file delivery table instance identifier;
   use the service identifier to identify a multimedia broadcast multicast service user service;
   identify one or more files to be downloaded from the multimedia broadcast multicast service user service using the file delivery table; and fetch at least one of the one or more files using at least one HTTP GET request.

13. An apparatus, comprising:
a processor; and
memory including computer program code, the memory and the computer program code configured to, with the processor, cause the apparatus at least to:
register with one of a server and a broadcast multicast switching center;
receive a push message according to a push protocol, the push message comprising a file delivery table instance identifier and a service identifier of a multimedia broadcast multicast service protocol, the service identifier being separate data from a file delivery table instance identified by the file delivery table instance identifier;
use the service identifier to identify a multimedia broadcast multicast service user service;
identify one or more files to be downloaded from the multimedia broadcast multicast service user service using the file delivery table instance; and
fetch at least one of the one or more files using at least one HTTP GET request.

14. The apparatus of claim 13, wherein the at least one of the one or more files comprises all files identified in the file delivery table instance, and wherein all of the files in the file delivery table instance are fetched using a single HTTP GET request.

15. The apparatus of claim 13, wherein the at least one of the one or more files comprises a logical group of files, and wherein the logical group of files are fetched using a single HTTP GET request.

16. The apparatus of claim 13, wherein the at least one of the one or more files comprises a single file, and wherein the single file is fetched using a single HTTP GET request.

17. The apparatus of claim 13, wherein the at least one of the one or more files comprises multiple unrelated files, and wherein the multiple unrelated files are fetched using multiple HTTP GET requests.

18. The apparatus of claim 13, wherein the at least one of the one or more files comprises multiple logical groups of files and wherein the multiple logical groups of files are fetched using multiple HTTP GET requests.

19. The apparatus of claim 13, wherein the at least one of the one or more files comprises a combination of multiple unrelated files and multiple logical groups of files, and wherein the combination is fetched using multiple HTTP GET requests.

20. The apparatus of claim 13, wherein the at least one of the one or more files comprises multiple unrelated files, and wherein the multiple unrelated files are fetched using a single HTTP GET request.

21. The apparatus of claim 13, wherein the at least one of the one or more files comprises multiple logical groups of files, and wherein the multiple logical groups of files are fetched using a single HTTP GET request.

22. The apparatus of claim 13, wherein the at least one of the one or more files comprises at least one unrelated file and at least one logical group of files, and wherein the at least one unrelated file and the at least one logical group of files are fetched using a single HTTP GET request.

23. The apparatus of claim 13, wherein the memory and computer program code are further configured to, with the processor, cause the apparatus at least to transmit an HTTP request to deregister from the broadcast multicast switching center.

24. An apparatus, comprising:
means for registering with one of a server and a broadcast multicast switching center;
means for receiving a push message according to a push protocol, the push message comprising a file delivery table instance identifier and a service identifier;
means for using the service identifier to identify a multimedia broadcast multicast service user service of a multimedia broadcast multicast service protocol, the service identifier being separate data from a file delivery table instance identified by the file delivery table instance identifier;
means for identifying one or more files to be downloaded from the multimedia broadcast multicast service user service using the file delivery table instance; and
means for fetching at least one of the one or more files using at least one HTTP GET request.

25. The apparatus of claim 24, wherein the at least one of the one or more files is fetched using a single HTTP GET request.

26. The apparatus of claim 24, wherein the at least one of the one or more files is fetched using multiple HTTP GET requests.

27. A method, comprising:
transmitting a push message to a registered device according to a push protocol, the push message comprising a file delivery table instance identifier and a service identifier of a multimedia broadcast multicast service protocol, the service identifier being separate data from a file delivery table instance identified by the file delivery table instance identifier, and the service identifier identifying a multimedia broadcast multicast service user service;
receiving a fetch request for one or more files from the registered device, the fetch request comprising at least one HTTP GET request; and
providing at least one of the one or more files in accordance with the at least one HTTP GET request.

28. The method of claim 27, wherein the at least one of the one or more files comprises all files identified in a file delivery table instance, and wherein the fetch request comprises a single HTTP GET request.

29. The method of claim 27, wherein the at least one of the one or more files comprises a logical group of files, and wherein the fetch request comprises a single HTTP GET request.

30. The method of claim 27, wherein the at least one of the one or more files comprises a single file, and wherein the fetch request comprises a single HTTP GET request.

31. The method of claim 27, wherein the at least one of the one or more files comprises multiple unrelated files, and wherein the fetch request comprises multiple HTTP GET requests.

32. The method of claim 27, wherein the at least one of the one or more files comprises multiple logical groups of files and wherein the fetch request comprises multiple HTTP GET requests.

33. The method of claim 27, wherein the at least one of the one or more files comprises a combination of multiple unrelated files and multiple logical groups of files, and wherein the fetch request comprises multiple HTTP GET requests.

34. The method of claim 27, wherein the at least one of the one or more files comprises multiple unrelated files, and wherein the fetch request comprises a single HTTP GET request.

35. The method of claim 27, wherein the at least one of the one or more files comprises multiple logical groups of files, and wherein the fetch request comprises a single HTTP GET request.

36. The method of claim 27, wherein the at least one of the one or more files comprises at least one file and at least one logical group of files, and wherein the fetch request comprises a single HTTP GET request.

37. The method of claim 27, further comprising:
receiving a HTTP request from the registered device to have the registered device deregistered; and
deregistering the registered device.

38. A non-transitory memory including computer-executable instructions which, when executed by a processor, cause an apparatus to:
transmit a push message to a registered device according to a push protocol, the push message comprising a file delivery table instance identifier and a service identifier of a multimedia broadcast multicast service protocol, the service identifier being separate data from a file delivery table instance identified by the file delivery table instance identifier, and the service identifier identifying a multimedia broadcast multicast service user service;
receive a fetch request for one or more files from the registered device, the fetch request comprising at least one HTTP GET request; and
provide at least one of the one or more files in accordance with the at least one HTTP GET request.

39. An apparatus, comprising:
a processor; and
memory including computer program code, the memory and the computer program code configured to, with the processor, cause the apparatus at least to:
transmit a push message to a registered device according to a push protocol, the push message comprising a file delivery table instance identifier and a service identifier of a multimedia broadcast multicast service protocol, the service identifier being separate data from a file delivery table instance identified by the file delivery table instance identifier, and the service identifier identifying a multimedia broadcast multicast service user service;
receive a fetch request for one or more files from the registered device, the fetch request comprising at least one HTTP GET request; and
provide at least one of the one or more files in accordance with the at least one HTTP GET request.

40. The apparatus of claim 39, wherein the at least one of the one or more files comprises all files identified in a file delivery table instance, and wherein the fetch request comprises a single HTTP GET request.

41. The apparatus of claim 39, wherein the at least one of the one or more files comprises a logical group of files, and wherein the fetch request comprises a single HTTP GET request.

42. The apparatus of claim 39, wherein the at least one of the one or more files comprises a single file, and wherein the fetch request comprises a single HTTP GET request.

43. The apparatus of claim 39, wherein the at least one of the one or more files comprises multiple unrelated files, and wherein the fetch request comprises multiple HTTP GET requests.

44. The apparatus of claim 39, wherein the at least one of the one or more files comprises multiple logical groups of files and wherein the fetch request comprises multiple HTTP GET requests.

45. The apparatus of claim 39, wherein the at least one of the one or more files comprises a combination of multiple unrelated files and multiple logical groups of files, and wherein the fetch request comprises multiple HTTP GET requests.

46. The apparatus of claim 39, wherein the at least one of the one or more files comprises multiple unrelated files, and wherein the fetch request comprises a single HTTP GET request.

47. The apparatus of claim 39, wherein the at least one of the one or more files comprises multiple logical groups of files, and wherein the fetch request comprises a single HTTP GET request.

48. The apparatus of claim 39, wherein the at least one of the one or more files comprises at least one unrelated file and at least one logical group of files, and wherein the fetch request comprises a single HTTP GET request.

49. The apparatus of claim 39, wherein the memory and the computer program code are further configured to, with the processor, cause the apparatus at least to:
receive a HTTP request from the registered device to have the registered device deregistered; and
deregister the registered device.

50. An apparatus, comprising:
means for transmitting a push message to a registered device according to a push protocol, the push message comprising a file delivery table instance identifier and a service identifier of a multimedia broadcast multicast service protocol, the service identifier being separate data from a file delivery table instance identified by the file delivery table instance identifier, and the service identifier identifying a multimedia broadcast multicast service user service;
means for receiving a fetch request for one or more files from the registered device, the fetch request comprising at least one HTTP GET request; and
means for providing at least one of the one or more files in accordance with the at least one HTTP GET request.

51. The apparatus of claim 50, wherein the fetch request comprises a single HTTP GET request.

52. The apparatus of claim 50, wherein the fetch request comprises multiple HTTP GET requests.

* * * * *

UNITED STATES PATENT AND TRADEMARK OFFICE
CERTIFICATE OF CORRECTION

PATENT NO. : 8,495,228 B2  
APPLICATION NO. : 12/104304  
DATED : July 23, 2013  
INVENTOR(S) : Imed Bouazizi et al.

Page 1 of 1

It is certified that error appears in the above-identified patent and that said Letters Patent is hereby corrected as shown below:

In the Claims

In Column 12, Claim 1, Line 9:
Delete "using a file delivery table instance;" and insert --using the file delivery table instance;--.

In Column 12, Claim 12, Line 67:
Delete "the file delivery table;" and insert --the file delivery table instance;--.

Signed and Sealed this
Twenty-ninth Day of April, 2014

Michelle K. Lee
*Deputy Director of the United States Patent and Trademark Office*